United States Patent
Sotokawa et al.

(10) Patent No.: US 12,259,200 B2
(45) Date of Patent: Mar. 25, 2025

(54) HEAT TRANSFER PLATE AND HEAT EXCHANGE ELEMENT

(71) Applicant: Mitsubishi Electric Corporation, Tokyo (JP)

(72) Inventors: Hajime Sotokawa, Tokyo (JP); Xin Wang, Tokyo (JP); Shunsaburo Okawa, Tokyo (JP); Satoshi Wakita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 244 days.

(21) Appl. No.: 17/797,474

(22) PCT Filed: Apr. 2, 2020

(86) PCT No.: PCT/JP2020/015209
§ 371 (c)(1),
(2) Date: Aug. 4, 2022

(87) PCT Pub. No.: WO2021/199407
PCT Pub. Date: Oct. 7, 2021

(65) Prior Publication Data
US 2023/0069888 A1    Mar. 9, 2023

(51) Int. Cl.
*F28F 3/04*  (2006.01)
*F28D 9/00*  (2006.01)

(52) U.S. Cl.
CPC ............ *F28F 3/046* (2013.01); *F28D 9/0037* (2013.01)

(58) Field of Classification Search
CPC ................. F28F 3/046; F28D 9/0037
See application file for complete search history.

(56) References Cited

U.S. PATENT DOCUMENTS 10,317,095 B2    6/2019  Dean et al.
2010/0294458 A1  11/2010  Murayama et al.
(Continued)

FOREIGN PATENT DOCUMENTS

DE    10329153 A1 *  1/2005  ........... F28D 9/0037
JP    S61243287   * 10/1986
(Continued)

OTHER PUBLICATIONS

Office Action issued in corresponding Japan Patent Application No. 2022-511467, dated Jan. 10, 2023, 8 pages including 5 pages of English translation.
(Continued)

*Primary Examiner* — Devon Russell
(74) *Attorney, Agent, or Firm* — BUCHANAN, INGERSOLL & ROONEY PC

(57) ABSTRACT

In a first and second corrugated portions of a first and second heat transfer plates, first front-side convex portions that are convex toward one side in a first direction and first back-side convex portions that are convex toward the opposite side in the first direction are alternately formed along a second direction. In at least one end of both ends of each of the first front-side convex portions in the second direction, a first front-side protruding portion protruding toward another first front-side convex portion is provided. The first front-side protruding portion is contactable with the second heat transfer plate. In at least one end of both ends of each of the second front-side convex portions in the second direction, a second front-side protruding portion protruding toward another second front-side convex portion is provided. The second front-side protruding portion is contactable with the first heat transfer plate.

6 Claims, 7 Drawing Sheets

(56) References Cited

U.S. PATENT DOCUMENTS

2014/0326432 A1   11/2014  Dean et al.
2019/0285289 A1    9/2019  Dean et al.

FOREIGN PATENT DOCUMENTS

| JP | H08128794 | * | 5/1996 |
| JP | H08291990 | * | 11/1996 |
| JP | 2000-153551 A | | 6/2000 |
| JP | 2004293862 A | * | 10/2004 |
| JP | 2015509178 A | | 3/2015 |
| WO | 2013091099 A1 | | 6/2013 |

OTHER PUBLICATIONS

Extended European Search Report issued in corresponding European Patent Application No. 20928761.4, mailed on Mar. 31, 2023, 7 pages.
International Search Report (PCT/ISA/210) with translation and Written Opinion (PCT/ISA/237) mailed on Jun. 16, 2020, by the Japan Patent Office as the International Searching Authority for International Application No. PCT/JP2020/015209. (10 pages).
Notice of Reasons for Refusal dated Jun. 13, 2023, issued in the corresponding Japanese Patent Application No. 2022-511467, 6 pages including 4 pages of English Translation.

* cited by examiner

FIG.5
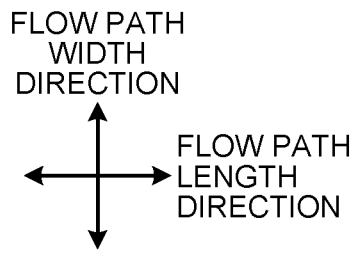
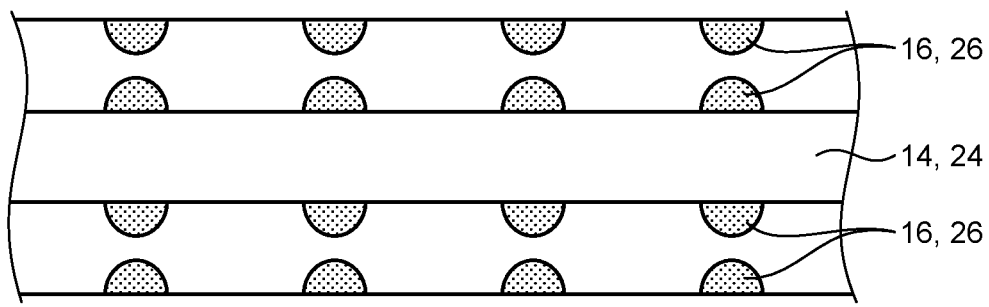
FIG.6
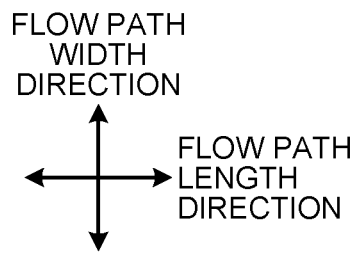
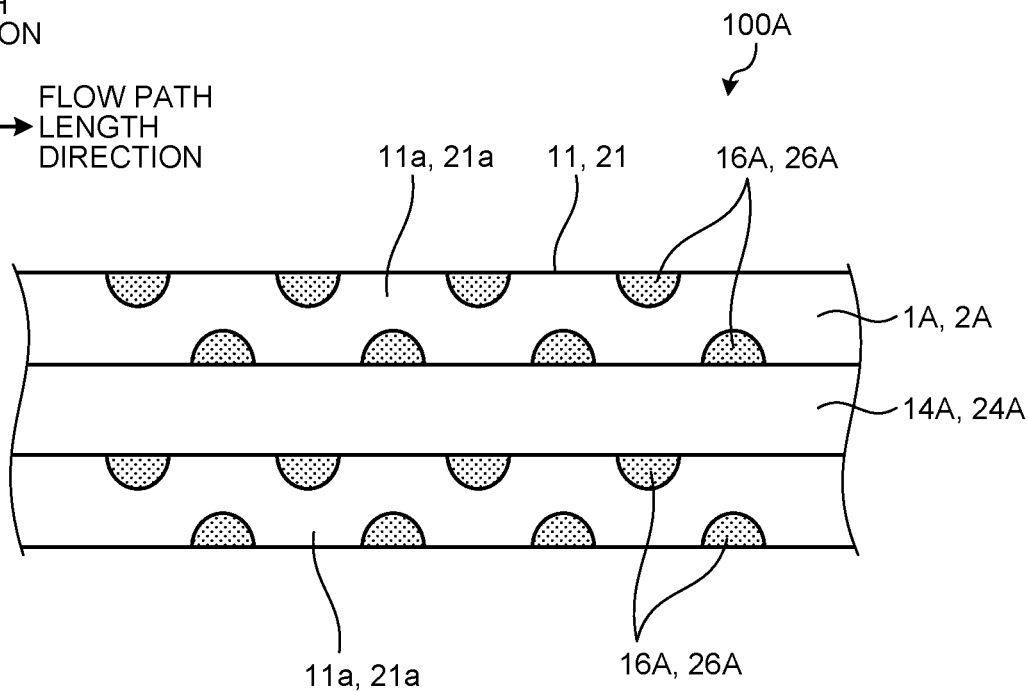

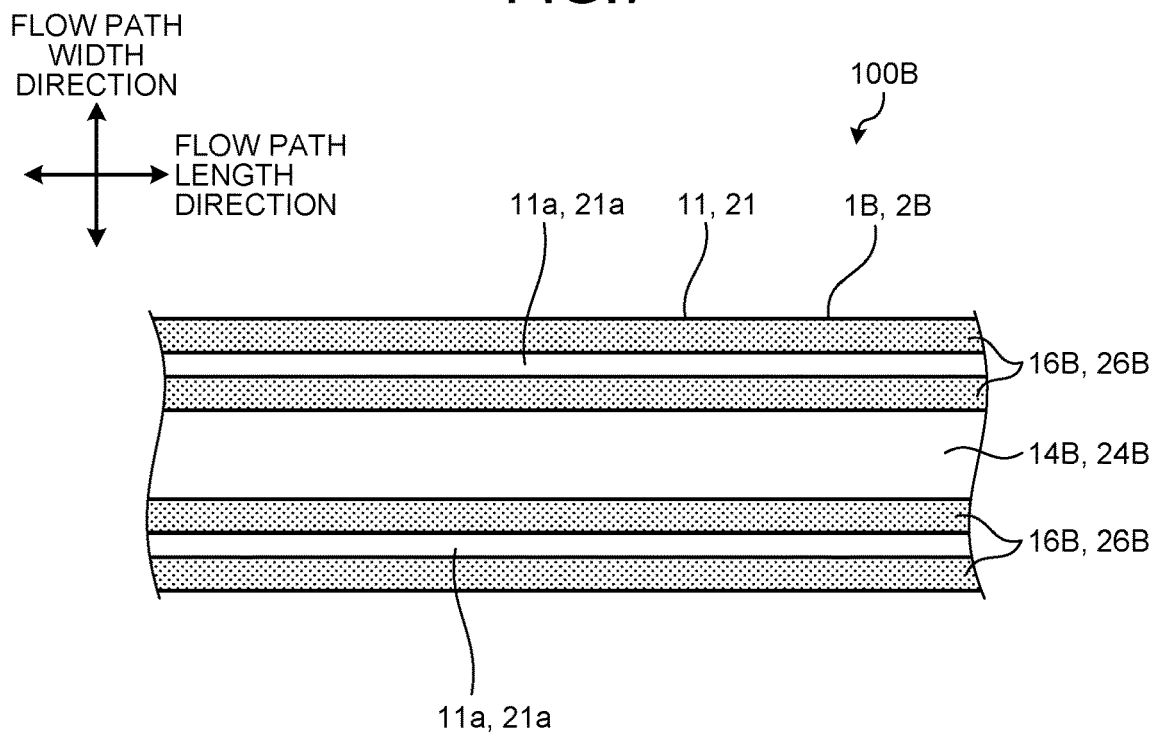
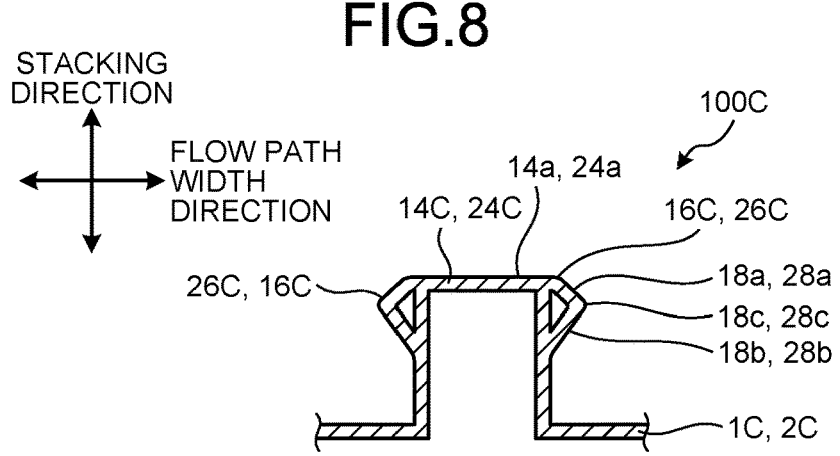
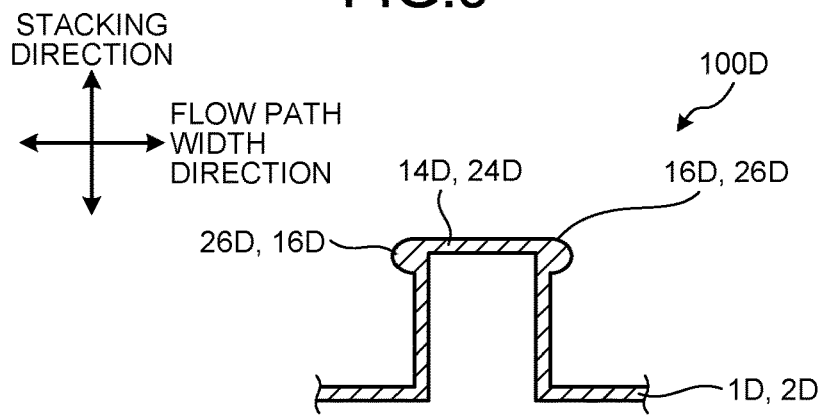

HEAT TRANSFER PLATE AND HEAT EXCHANGE ELEMENT

FIELD

The present disclosure relates to a heat transfer plate that performs heat exchange between air flows, and a heat exchange element including the heat transfer plate.

BACKGROUND

Conventionally, a heat exchange element that performs heat exchange between a supply air flow that flows from the outside to the inside of a room and an exhaust air flow that flows from the inside to the outside of the room is known. Ventilation using such a heat exchange element can secure good air quality in the room while improving the efficiency of cooling and heating in the room and reducing energy used for air conditioning in the room.

Patent Literature 1 discloses a heat exchange element formed by stacked sheet-like heat transfer plates. A plurality of flow paths are formed between adjacent ones of the heat transfer plates. Each of the plurality of heat transfer plates has a corrugated portion formed in a corrugated shape. Parts of the plurality of flow paths are formed by the corrugated portions. In each of the corrugated portions, convex portions that are convex toward one side in the stacking direction and convex portions that are convex toward the opposite side in the stacking direction are alternately formed along the flow path width direction.

CITATION LIST

Patent Literature

Patent Literature 1: Japanese Translation of PCT International Application Laid-open No. 2015-509178

SUMMARY

Technical Problem

However, according to the technique disclosed in Patent Literature 1, sheet-like heat transfer plates are used, so that the rigidity of the corrugated portions cannot be secured, and there is a possibility that the corrugated portions are deformed to fall when the plurality of heat transfer plates are stacked. As a result, the flow paths may be blocked or excessively opened, causing variations in pressure loss among the plurality of flow paths and then causing deterioration of the heat exchange efficiency, which is disadvantageous.

The present disclosure has been made in view of the above, and an object thereof is to obtain a heat transfer plate capable of suppressing deformation of corrugated portions.

Solution to Problem

In order to overcome the above-described disadvantage and achieve the object, a heat transfer plate according to the present disclosure includes a plurality of flow paths formed on both front and back surfaces in a first direction and is for forming a heat exchange element by stacking a plurality of the heat transfer plates in the first direction, the heat transfer plate including a corrugated portion having a corrugated shape that forms parts of respective ones of the plurality of flow paths. The corrugated portion includes front-side convex portions that are convex toward one side in the first direction aback-side convex portions that are convex toward an opposite side in the first direction, the front-side convex portions and the back-side convex portions being formed alternately along a second direction orthogonal to the first direction. At at least one of both ends of each of the front-side convex portions in the second direction, there is provided a front-side protruding portion that protrudes toward another one, adjacent in the second direction, of the front-side convex portions and that is contactable with another one, adjacent to the heat transfer plate in the first direction, of the heat transfer plates included in the heat exchange element.

Advantageous Effects of Invention

The heat transfer plate according to the present disclosure has an effect of suppressing deformation of the corrugated portion.

BRIEF DESCRIPTION OF DRAWINGS

FIG. 5 is a partially enlarged plan view illustrating first front-side protruding portions or second front-side protruding portions.

FIG. 6 is a partially enlarged plan view illustrating first front-side protruding portions or second front-side protruding portions of a heat exchange element according to a first modification of the first embodiment.

FIG. 7 is a partially enlarged plan view illustrating first front-side protruding portions and second front-side protruding portions of a heat exchange element according to a second modification of the first embodiment.

FIG. 8 is a cross-sectional view illustrating first front-side protruding portions and second front-side protruding portions of a heat exchange element according to a third modification of the first embodiment.

FIG. 9 is a cross-sectional view illustrating first front-side protruding portions and second front-side protruding portions of a heat exchange element according to a fourth modification of the first embodiment.

DESCRIPTION OF EMBODIMENTS

Hereinafter, heat transfer plates and heat exchange elements according to embodiments of the present disclosure will be described in detail with reference to the drawings.

First Embodiment

Figure 1:
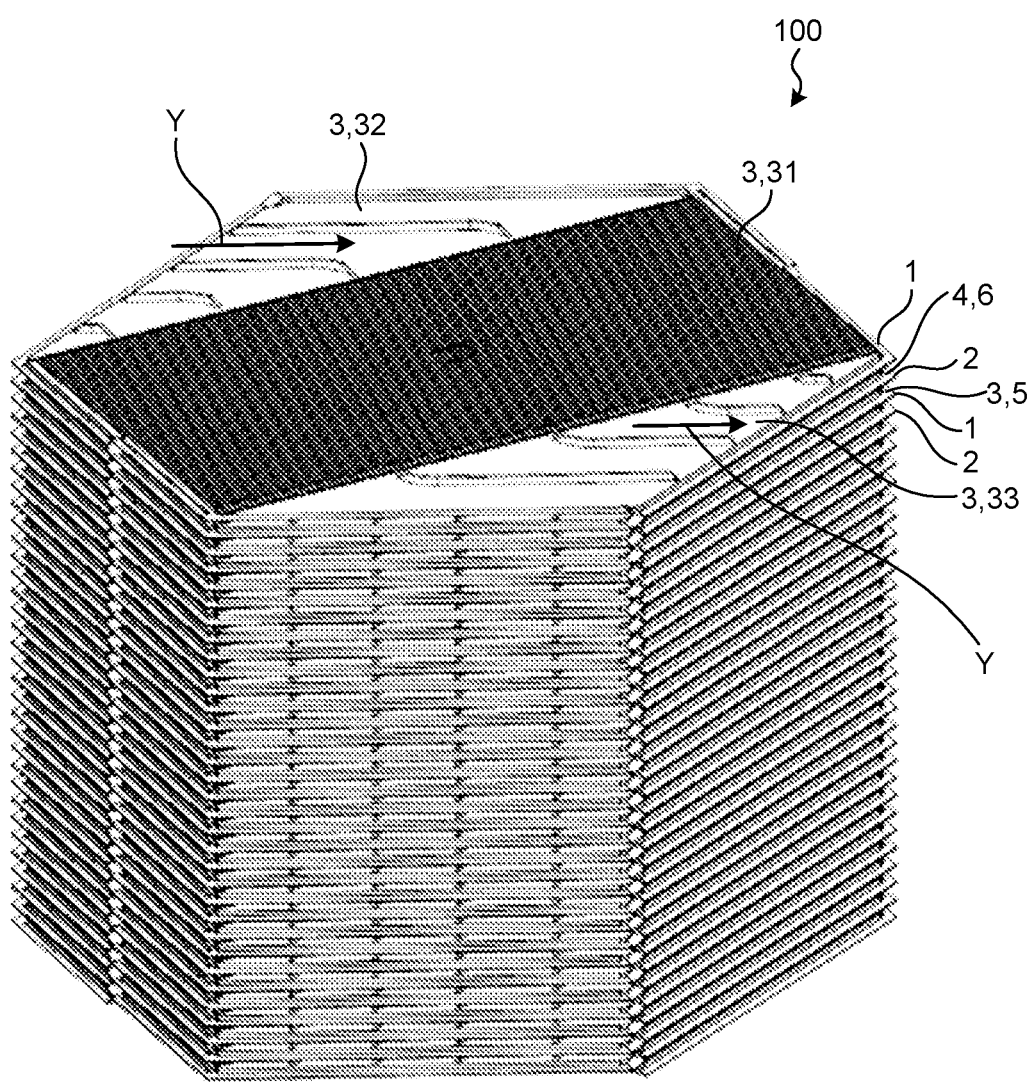
FIG. 1 is a perspective view illustrating a heat exchange element according to a first embodiment.

FIG. 1 is a perspective view illustrating a heat exchange element 100 according to a first embodiment. An arrow Y in FIG. 1 indicates a flow of fluid. The heat exchange element 100 is formed to have a hexagonal columnar shape. The heat exchange element 100 is formed by first heat transfer plates 1 and second heat transfer plates 2 stacked alternately. The first heat transfer plates 1 and the second heat transfer plates 2 are formed using resin sheets having polypropylene, polystyrene, polyethylene terephthalate, or the like as a base material. Between the front surface of one of the first heat transfer plates 1 and the back surface of the adjacent one of the second heat transfer plates 2, a plurality of first flow paths 3 are formed. Between the back surface of one of the first heat transfer plates 1 and the front surface of the adjacent one of the second heat transfer plates 2, a plurality of second flow paths 4 are formed. The first flow paths 3 and the second flow paths 4 are flow paths independent of each other. In the following description, fluid flowing through the first flow paths 3 is referred to as a "first air flow 5", and fluid flowing through the second flow paths 4 is referred to as a "second air flow 6". A direction in which the first heat transfer plates 1 and the second heat transfer plates 2 are stacked is referred to as a "stacking direction". The length direction of each of the flow paths 3 and 4 is referred to as a "flow path length direction". The width direction of each of the flow paths 3 and 4 is referred to as a "flow path width direction". The stacking direction, the flow path length direction, and the flow path width direction are orthogonal to each other. The word "orthogonal" in the present specification may express a relationship that is not strictly orthogonal and slightly oblique in addition to a relationship that is completely orthogonal. In addition, the first heat transfer plates 1 and the second heat transfer plates 2 may be collectively referred to as heat transfer plates 1 and 2.

Figure 2:
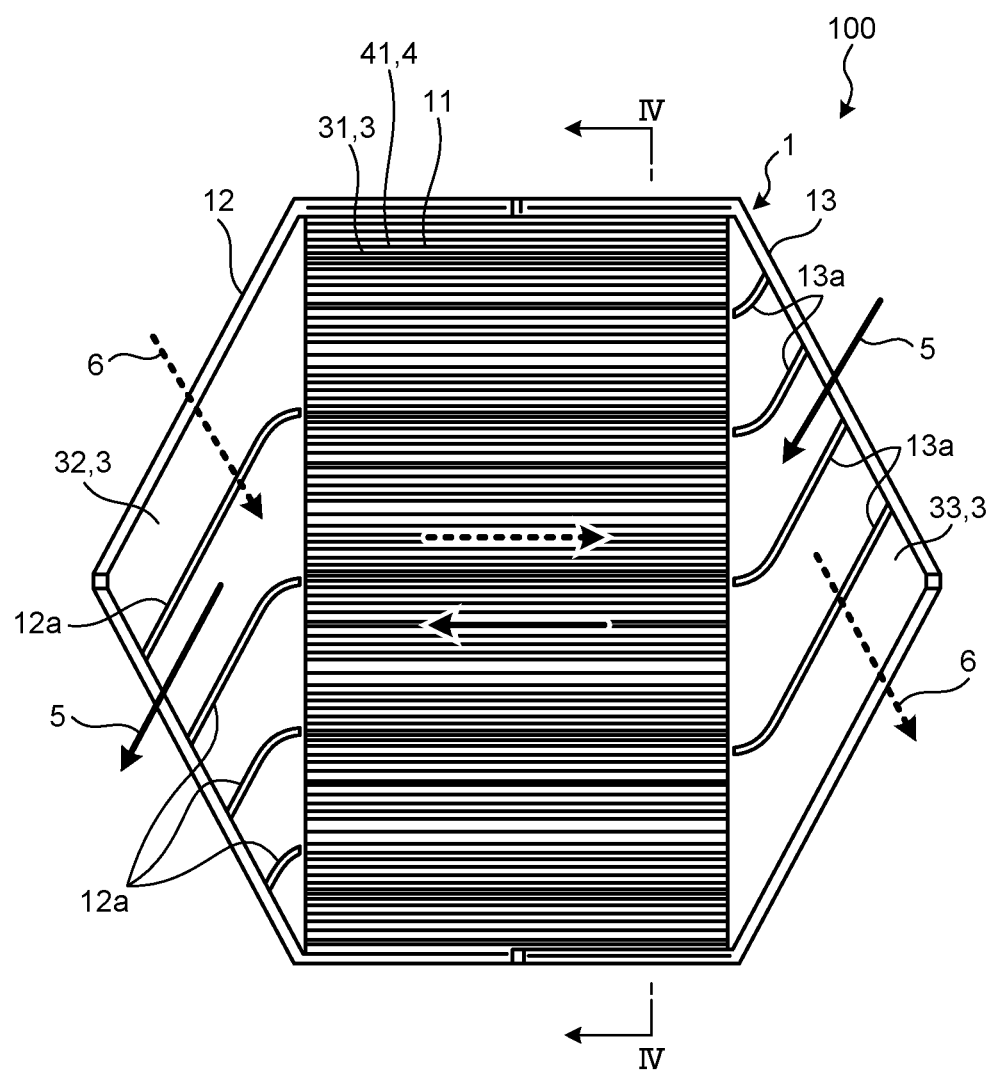
FIG. 2 is a plan view illustrating a first heat transfer plate of the heat exchange element according to the first embodiment.

FIG. 2 is a plan view illustrating one of the first heat transfer plates 1 of the heat exchange element 100 according to the first embodiment. The first heat transfer plate 1 includes: a first corrugated portion 11; a first header portion 12 connected to one end of the first corrugated portion 11 along the flow path length direction; and a second header portion 13 connected to the opposite end of the first corrugated portion 11 along the flow path length direction. Solid arrows in FIG. 2 indicate the flow of the first air flow 5 over: the front surface of the first corrugated portion 11; the front surface of the first header portion 12; and the front surface of the second header portion 13. Broken-line arrows illustrated in FIG. 2 indicate the flow of the second air flow 6 over: the back surface of the first corrugated portion 11; the back surface of the first header portion 12; and the back surface of the second header portion 13.

The first corrugated portion 11 is a portion: that forms a plurality of first partial flow paths 31 between the first corrugated portion 11 and the back surface of one of second corrugated portions 21 described below; and that forms a plurality of fourth partial flow paths 41 between the first corrugated portion 11 and the front surface of one of the second corrugated portions 21. The shape of the first corrugated portion 11 when viewed from the stacking direction is a rectangle. The plurality of first partial flow paths 31 are parts of respective ones of the plurality of first flow paths 3. The plurality of fourth partial flow paths 41 are parts of respective ones of the plurality of second flow paths 4. The first corrugated portion 11 is formed in a corrugated shape formed by peaks and valleys that are alternately continued. The first corrugated portion 11 will be described in detail later.

The first header portion 12 is a portion that forms a plurality of second partial flow paths 32 between the first header portion 12 and the back surface of a third header portion 22 to be described below. The shape of the first header portion 12 when viewed from the stacking direction is an isosceles triangle. The plurality of second partial flow paths 32 are connected to ends of respective ones of the first partial flow paths 31, and is parts of respective ones of the plurality of first flow paths 3. On the front surface of the first header portion 12, a plurality of first flow path ribs 12a are formed at intervals. The first flow path ribs 12a abut on the back surface of the third header portion 22 described below. Between the front surface of the first header portion 12 and the back surface of the third header portion 22, the plurality of second partial flow paths 32 defined by the first flow path ribs 12a are formed. The lengths of the plurality of second partial flow paths 32 are different from each other. The lengths of the second partial flow paths 32 are shorter from one side to the opposite side in the flow path width direction.

The second header portion 13 is a portion that forms a plurality of third partial flow paths 33 between the second header portion 13 and the back surface of a fourth header portion 23 to be described below. The shape of the second header portion 13 when viewed from the stacking direction is an isosceles triangle. The plurality of third partial flow paths 33 are connected to the opposite ends of respective ones of the first partial flow paths 31, and are parts of respective ones of the plurality of first flow paths 3. On the front surface of the second header portion 13, a plurality of second flow path ribs 13a are formed at intervals. The second flow path ribs 13a abut on the back surface of the fourth header portion 23 described below. Between the front surface of the second header portion 13 and the back surface of the fourth header portion 23, the plurality of third partial flow paths 33 defined by the second flow path ribs 13a are formed. The lengths of the plurality of third partial flow paths 33 are different from each other. The lengths of the third partial flow paths 33 are longer from one side to the opposite side in the flow path width direction. The first flow path ribs 12a and the second flow path ribs 13a are inclined with respect to the flow path length direction of the first partial flow paths 31. That is, the second partial flow paths 32 and the third partial flow paths 33 are inclined with respect to first partial flow paths 31. The first air flow 5 flowing in from the third partial flow paths 33 passes through the second partial flow paths 32 via the first partial flow paths 31.

Figure 3:
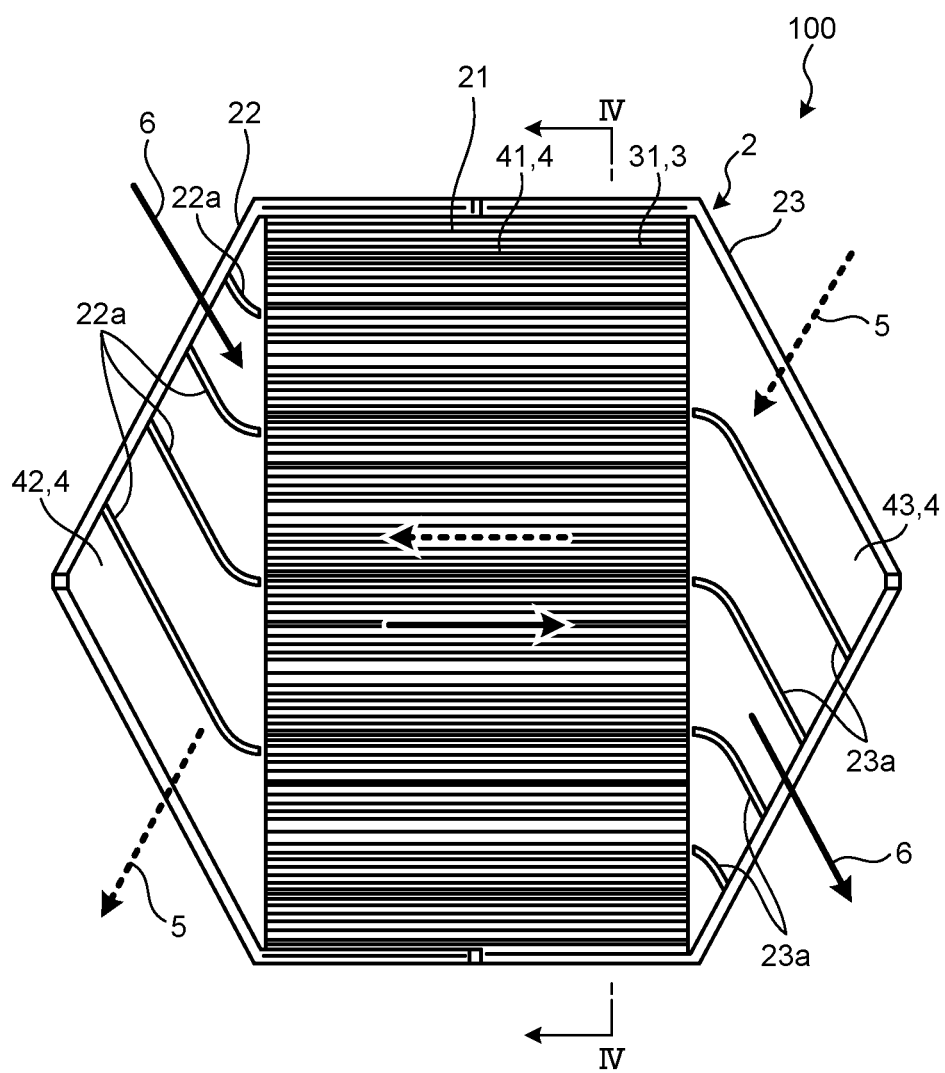
FIG. 3 is a plan view illustrating a second heat transfer plate of the heat exchange element according to the first embodiment.

FIG. 3 is a plan view illustrating one of the second heat transfer plates 2 of the heat exchange element 100 according to the first embodiment. The second heat transfer plate 2 includes: a second corrugated portion 21; a third header portion 22 connected to one end of the second corrugated portion 21 along the flow path length direction; and a fourth header portion 23 connected to the opposite end of the second corrugated portion 21 along the flow path length direction. Solid arrows in FIG. 3 indicate the flow of the second air flow 6 flowing over the front surface of the second corrugated portion 21, the front surface of the third header portion 22, and the front surface of the fourth header portion 23. Broken-line arrows illustrated in FIG. 3 indicate the flow of the first air flow 5 flowing over the back surface of the second corrugated portion 21, the back surface of the third header portion 22, and the back surface of the fourth header portion 23.

The second corrugated portion 21 is a portion: that forms the plurality of fourth partial flow paths 41 between the second corrugated portion 21 and the back surface of the first corrugated portion 11; and that forms the plurality of first partial flow paths 31 between the second corrugated portion 21 and the front surface of the first corrugated portion 11.

The shape of the second corrugated portion 21 when viewed from the stacking direction is a rectangle. The plurality of fourth partial flow paths 41 are parts of respective ones of the plurality of second flow paths 4. The plurality of first partial flow paths 31 are parts of respective ones of the plurality of first flow paths 3. The second corrugated portion 21 is formed in a corrugated shape formed by peaks and valleys that are alternately continued. The second corrugated portion 21 will be described in detail later. As illustrated in FIGS. 2 and 3, the first partial flow paths 31 and the fourth partial flow paths 41 are parallel to each other. The flow direction of the first air flow 5 passing through the first partial flow paths 31 and the flow direction of the second air flow 6 passing through the fourth partial flow paths 41 are different from each other by 180 degrees. Heat is transferred between the first air flow 5 passing through the first partial flow paths 31 and the second air flow 6 passing through the fourth partial flow paths 41. The heat exchange element 100 may be configured to transfer sensible heat and latent heat between air flows, or may be configured to transfer only sensible heat.

As illustrated in FIG. 3, the third header portion 22 is a portion that forms a plurality of fifth partial flow paths 42 between the third header portion 22 and the back surface of the first header portion 12. The shape of the third header portion 22 when viewed from the stacking direction is an isosceles triangle. The plurality of fifth partial flow paths 42 are connected to one ends of respective ones of the fourth partial flow paths 41, and are parts of respective ones of the plurality of second flow paths 4. On the front surface of the third header portion 22, a plurality of third flow path ribs 22a are formed at intervals. The third flow path ribs 22a abut on the back surface of the first header portion 12. Between the front surface of the third header portion 22 and the back surface of the first header portion 12, the plurality of fifth partial flow paths 42 defined by the third flow path ribs 22a are formed. The lengths of the plurality of fifth partial flow paths 42 are different from each other. The lengths of the fifth partial flow paths 42 are longer from one side to the opposite side in the flow path width direction. As illustrated in FIGS. 2 and 3, the flow direction of the first air flow 5 passing through the second partial flow paths 32 and the flow direction of the second air flow 6 passing through the fifth partial flow paths 42 intersect each other.

As illustrated in FIG. 3, the fourth header portion 23 is a portion that forms a plurality of sixth partial flow paths 43 between the fourth header portion 23 and the back surface of the second header portion 13. The shape of the fourth header portion 23 when viewed from the stacking direction is an isosceles triangle. The plurality of sixth partial flow paths 43 are connected to the opposite ends of respective ones of the fourth partial flow paths 41, and is parts of respective ones of the plurality of second flow paths 4. On the front surface of the fourth header portion 23, a plurality of fourth flow path ribs 23a are formed at intervals. The fourth flow path ribs 23a abut on the back surface of the second header portion 13. Between the front surface of the fourth header portion 23 and the back surface of the second header portion 13, the plurality of sixth partial flow paths 43 defined by the fourth flow path ribs 23a is formed. The lengths of the plurality of sixth partial flow paths 43 are different from each other. The lengths of the sixth partial flow paths 43 are shorter from one side to the opposite side in the flow path width direction. The third flow path ribs 22a and the fourth flow path ribs 23a are inclined with respect to the flow path length direction of the fourth partial flow paths 41. That is, the fifth partial flow paths 42 and the sixth partial flow paths 43 are inclined with respect to the fourth partial flow paths 41. The second air flow 6 flowing in from the fifth partial flow paths 42 passes through the sixth partial flow paths 43 via the fourth partial flow paths 41. As illustrated in FIGS. 2 and 3, the flow direction of the first air flow 5 passing through the third partial flow paths 33 and the flow direction of the second air flow 6 passing through the sixth partial flow paths 43 intersect each other.

Figure 4:
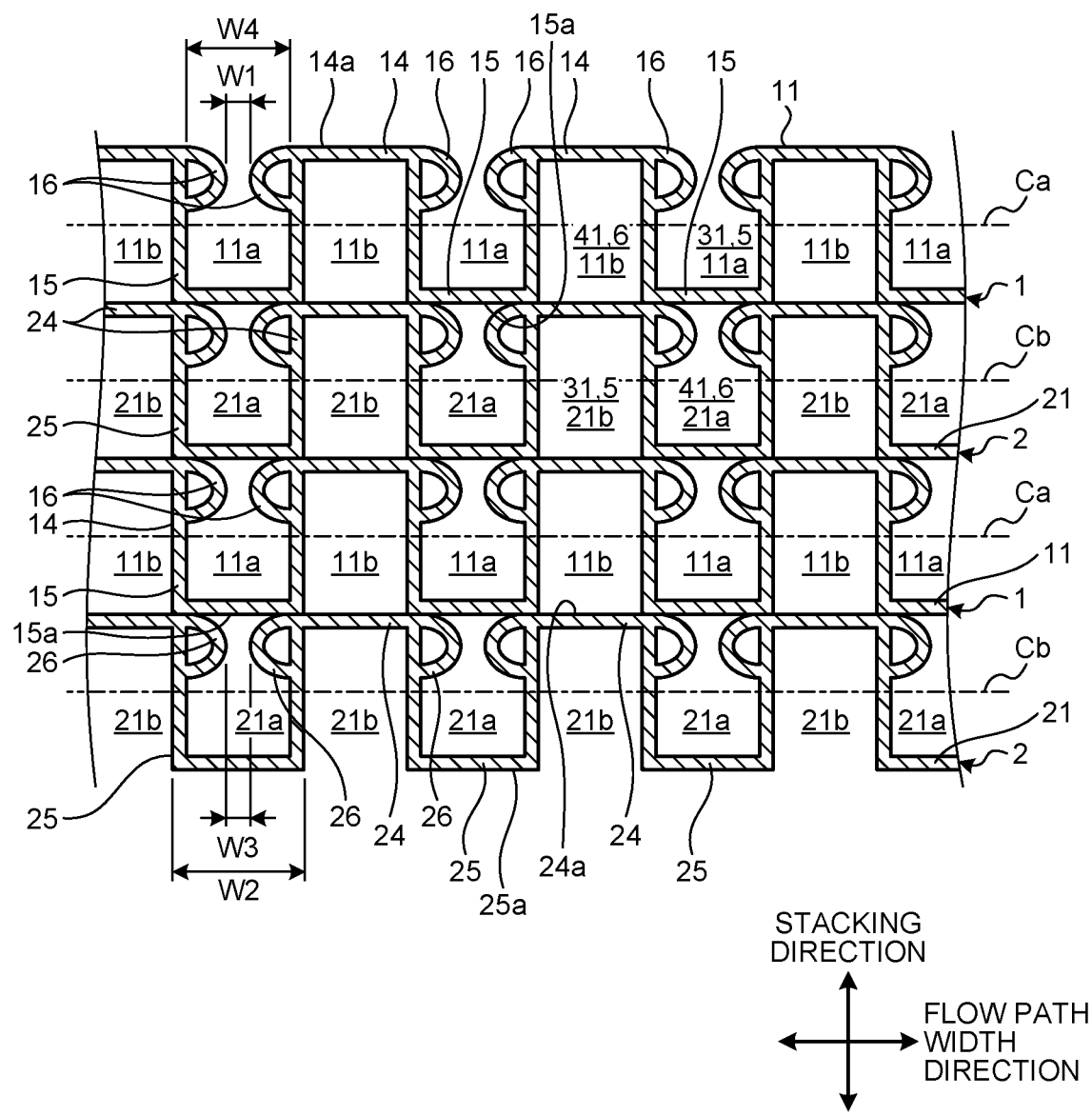
FIG. 4 is a cross-sectional view taken along line IV-IV in FIGS. 2 and 3.

The first corrugated portion 11 will be described in detail with reference to FIG. 4. FIG. 4 is a cross-sectional view taken along line IV-IV in FIGS. 2 and 3. In the first corrugated portion 11, first front-side convex portions 14 that are convex toward one side in the stacking direction and first back-side convex portions 15 that are convex toward the opposite side in the stacking direction are alternately formed along the flow path width direction. Two-dot chain lines Ca in FIG. 4 are center lines passing through the centers of the first corrugated portions 11 in the stacking direction, and are boundary lines between the first front-side convex portions 14 and the first back-side convex portions 15. Hereinafter, an upward direction that is one side in the stacking direction is defined as +X, and a downward direction that is the opposite side in the stacking direction is defined as −X.

At both ends of each of the first front-side convex portions 14 in the flow path width direction, there are provided first front-side protruding portions 16. The first front-side protruding portions 16 protrude toward the other first front-side convex portions 14, adjacent in the flow path width direction. The first front-side protruding portions 16 are contactable with the second heat transfer plates 2 that are adjacent to the first heat transfer plate 1 in the +X direction in the stacking direction. The first front-side protruding portions 16 serve to support second back-side convex portions 25, to be described below, of the second heat transfer plate 2. The first front-side protruding portions 16 are preferably provided within a range from the middle between apex portions 14a of the first front-side convex portions 14 and apex portions 15a of the first back-side convex portions 15 to the apex portions 14a of the first front-side convex portions 14 in the stacking direction. The first front-side protruding portions 16 are more preferably provided at a position close to the apex portions 14a of the first front-side convex portions 14 in the stacking direction. The first front-side protruding portions 16 do not protrude in the +X direction of the stacking direction from the apex portions 14a of the first front-side convex portions 14. The first front-side protruding portions 16 are formed to have a symmetrical shape in the stacking direction. The shape of the first front-side protruding portions 16 is not particularly limited. However, in the first embodiment, the first front-side protruding portions 16 are hollow semicircular shape that is convex toward the other first front-side convex portions 14 adjacent in the flow path width direction. The plate thickness of the first front-side convex portions 14 including the first front-side protruding portions 16 is uniform.

The first corrugated portion 11 includes a plurality of first front-side flow paths 11a and a plurality of first back-side flow paths 11b. The first front-side flow paths 11a and the first back-side flow paths 11b are alternately arranged in the flow path width direction. The first front-side flow paths 11a serve as the first partial flow paths 31 through which the first air flow 5 passes. The first back-side flow paths 11b serve as the fourth partial flow paths 41 through which the second air flow 6 passes. The first front-side flow paths 11a are quadrangular flow paths each formed by two of the first front-side convex portions 14 adjacent to one of the first back-side convex portions 15 in the flow path width direction and a corresponding one of the second back-side convex portions 25 to be described below that surround the quadrangular flow path. The first back-side flow paths 11b are quadrangular flow paths each formed by two of the first back-side convex portions 15 adjacent to one of the first front-side convex portions 14 in the flow path width direction, and a corresponding one of second front-side convex portions 24 to be described below that surround the quadrangular flow path. In the first front-side flow paths 11a, the first front-side protruding portions 16 are disposed. When the interval between the centers of two adjacent ones of the first front-side flow paths 11a is defined as one pitch, the number of pitches of the first front-side flow paths 11a is preferably 40 or more, more preferably 80 or more, still more preferably 140 or more. When the interval between the centers of two adjacent ones of the first back-side flow paths 11b is defined as one pitch, the number of pitches of the first back-side flow paths 11b is preferably 40 or more, more preferably 80 or more, still more preferably 140 or more.

The second corrugated portion 21 will be described in detail with reference to FIG. 4. In the second corrugated portion 21, the second front-side convex portions 24 that are convex toward one side in the stacking direction and the second back-side convex portions 25 that are convex toward the opposite side in the stacking direction are alternately formed along the flow path width direction. Two-dot chain line Cb in FIG. 4 are center lines passing through the centers of the second corrugated portions 21 in the stacking direction, and are boundary lines between the second front-side convex portions 24 and the second back-side convex portions 25. The first front-side convex portions 14 and the second front-side convex portions 24 are disposed at positions coinciding with each other in the stacking direction. The first back-side convex portions 15 and the second back-side convex portions 25 are disposed at positions coinciding with each other in the stacking direction.

At both ends of each of the second front-side convex portions 24 in the flow path width direction, there are provided second front-side protruding portions 26. The second front-side protruding portions 26 protrude toward the other second front-side convex portions 24, adjacent in the flow path width direction. The second front-side protruding portions 26 are contactable with the first heat transfer plates 1 adjacent to the second heat transfer plate 2 in the +X direction in the stacking direction. The second front-side protruding portions 26 serve to support the first back-side convex portions 15 of the first heat transfer plate 1. The second front-side protruding portions 26 are preferably provided within a range from the middle between apex portions 24a of the second front-side convex portions 24 and apex portions 25a of the second back-side convex portions 25 to the apex portions 24a of the second front-side convex portions 24 in the stacking direction. The second front-side protruding portions 26 are more preferably provided at a position close to the apex portions 24a of the second front-side convex portions 24 in the stacking direction. The second front-side protruding portions 26 do not protrude from the apex portions 24a of the second front-side convex portions 24 in the +X direction of the stacking direction. The second front-side protruding portions 26 are formed to have a symmetrical shape in the stacking direction. The shape of the second front-side protruding portions 26 is not particularly limited. However, in the first embodiment, the second front-side protruding portions 26 are hollow semicircular shape that is convex toward the other second front-side convex portions 24 adjacent in the flow path width direction. The plate thickness of the second front-side convex portions 24 including the second front-side protruding portions 26 is uniform.

The second corrugated portion 21 includes: a plurality of second front-side flow paths 21a; and a plurality of second back-side flow paths 21b. The second front-side flow paths 21a and the second back-side flow paths 21b are alternately arranged in the flow path width direction. The second front-side flow paths 21a serve as the fourth partial flow paths 41 through which the second air flow 6 passes. The second back-side flow paths 21b serve as the first partial flow paths 31 through which the first air flow 5 passes. The second front-side flow paths 21a are quadrangular flow paths each surrounded and formed by: the second back-side convex portions 25; two of the second front-side convex portions 24 adjacent to each other in the flow path width direction; and a corresponding one of the first back-side convex portions 15. The second back-side flow paths 21b are quadrangular flow paths each surrounded and formed by: the second front-side convex portions 24; two of the second back-side convex portions 25 adjacent to each other in the flow path width direction; and a corresponding one of the first front-side convex portions 14. In the second front-side flow paths 21a, the second front-side protruding portions 26 are disposed. The first front-side flow paths 11a and the second front-side flow paths 21a are alternately arranged in the stacking direction. The first back-side flow paths 11b and the second back-side flow paths 21b are alternately arranged in the stacking direction. When the interval between the centers of two adjacent ones of the second front-side flow paths 21a is defined as one, the number of pitches of the second front-side flow paths 21a is preferably 40 or more, more preferably 80 or more, still more preferably 140 or more. When the interval between the centers of two adjacent ones of the second back-side flow paths 21b is defined as one, the number of pitches of the second back-side flow paths 21b is preferably 40 or more, more preferably 80 or more, still more preferably 140 or more.

In the first front-side flow paths 11a, two of the first front-side protruding portions 16 that are adjacent with each other in the flow path width direction are arranged with a gap in the flow path width direction. When the size of the gap between the two first front-side protruding portions 16 adjacent in the flow path width direction is defined as W1; and the width of the second back-side convex portions 25 along the flow path width direction is defined as W2; the relationship W2>W1 is satisfied. The size W1 of the gap between two of the first front-side protruding portions 16 adjacent in the flow path width direction is smaller than the width W2 of the second back-side convex portions 25 along the flow path width direction. In the second front-side flow paths 21a, two of the second front-side protruding portions 26 that are adjacent with each other in the flow path width direction are arranged with a gap in the flow path width direction. When the size of the gap between the two second front-side protruding portions 26 adjacent in the flow path width direction is defined as W3 and the width of the first back-side convex portions 15 along the flow path width direction is defined as W4, the relationship W4>W3 is satisfied. The size W3 of the gap between two of the second front-side protruding portions 26 adjacent in the flow path width direction is smaller than a width W4 of the first back-side convex portions 15 along the flow path width direction.

FIG. 5 is a partially enlarged plan view illustrating the first front-side protruding portions 16 and the second front-side protruding portions 26. Since the first front-side protruding portions 16 and the second front-side protruding portions 26 have the same structure, both of the reference signs of the first front-side protruding portions 16 and the second front-side protruding portions 26 are provided together in FIG. 5. In FIG. 5, the regions of the first front-side protruding portions 16 and the second front-side protruding portions 26 are clarified by dot hatching. As illustrated in FIG. 5, the plurality of first front-side protruding portions 16 are provided at intervals along the flow path length direction. The first front-side protruding portions 16 provided at one end, in the flow path width direction, of each of the first front-side convex portions 14 and the first front-side protruding portions 16 provided at the opposite end of the first front-side convex portion 14 are disposed at the same positions in the flow path length direction. The plurality of second front-side protruding portions 26 are provided at intervals along the flow path length direction. The second front-side protruding portions 26 provided at one end, in the flow path width direction, of each of the second front-side convex portions 24 and the second front-side protruding portions 26 provided at the opposite end of the second front-side convex portion 24 are disposed at the same positions in the flow path length direction.

Next, a method of manufacturing the heat exchange element 100 will be described with reference to FIGS. 1 to 4. The method of manufacturing the heat exchange element 100 illustrated in FIG. 1 includes a forming process, a trimming process, and a stacking process. In the forming process, by vacuum forming, hot press forming, or the like: the first corrugated portion 11, the first header portion 12, the second header portion 13 illustrated in FIG. 2, and the first front-side protruding portions 16 illustrated in FIG. 4 are integrally formed; and the second corrugated portion 21, the third header portion 22, the fourth header portion 23 illustrated in FIG. 3, and the second front-side protruding portions 26 illustrated in FIG. 4 are integrally formed. In the trimming process, the formed first heat transfer plate 1 and second heat transfer plate 2 are trimmed to adjust the outer shapes thereof. In the stacking process, as illustrated in FIG. 1, the first heat transfer plates 1 and the second heat transfer plates 2 are stacked alternately. In addition, in the stacking process, in order to prevent the two air flows 5 and 6 from being mixed with the same flow path 3 or 4, a joining process of joining the first heat transfer plates 1 and the second heat transfer plates 2 is performed. In the joining process, it is desirable to perform adhesion using an adhesive or a welding process using heat, ultrasonic waves, or the like. To each of the six corners of the heat exchange element 100 manufactured through the above-described processes, a frame (not illustrated) formed of resin is attached. By filling a gap between the heat exchange element 100 and the frame with a sealing agent, it is possible to prevent the two air flows 5 and 6 from entering the gap between the heat exchange element 100 and the frame, and prevent mixture of the two air flows 5 and 6 in the heat exchange element 100.

Next, effects of the heat exchange element 100 will be described.

As illustrated in FIG. 4, in the first embodiment, at both ends of each of the first front-side convex portions 14 in the flow path width direction, there are provided the first front-side protruding portions 16 that protrude toward the other first front-side convex portions 14 adjacent in the flow path width direction. The first front-side protruding portions 16 are contactable with the second heat transfer plates 2 that are adjacent to the first heat transfer plate 1 in the +X direction in the stacking direction. Therefore, when the plurality of first heat transfer plates 1 and the plurality of second heat transfer plates 2 are stacked, the first front-side protruding portions 16 of the first heat transfer plates 1 can support the second back-side convex portions 25 of the second heat transfer plates 2. As a result, deformation of the first corrugated portions 11 can be suppressed, and falling of the second back-side convex portions 25 into the first front-side flow paths 11a can be suppressed, so that it is possible to suppress blockage or excessive open of the first partial flow paths 31 and the fourth partial flow paths 41. Therefore, it is possible: to suppress variations in pressure loss among the plurality of first partial flow paths 31; and to suppress variations in pressure loss among the plurality of fourth partial flow paths 41, so that it is possible to improve heat exchange efficiency of the heat exchange element 100.

In the first embodiment, at both ends of each of the second front-side convex portions 24 in the flow path width direction, there are provided the second front-side protruding portions 26 that protrude toward the other second front-side convex portions 24 adjacent in the flow path width direction. The second front-side protruding portions 26 are contactable with the first heat transfer plates 1 that are adjacent to the second heat transfer plate 2 in the +X direction in the stacking direction. Therefore, when the plurality of first heat transfer plates 1 and the plurality of second heat transfer plates 2 are stacked, the second front-side protruding portions 26 of the second heat transfer plates 2 can support the first back-side convex portions 15 of the first heat transfer plates 1. As a result, deformation of the second corrugated portions 21 can be suppressed, and falling of the first back-side convex portions 15 into the second front-side flow paths 21a can be suppressed, so that it is possible to suppress blockage or excessive open of the first partial flow paths 31 and the fourth partial flow paths 41. Therefore, it is possible: to suppress variations in pressure loss among the plurality of first partial flow paths 31; and to suppress variations in pressure loss among the plurality of fourth partial flow paths 41, so that it is possible to improve heat exchange efficiency of the heat exchange element 100.

In the first embodiment, the size W1 of the gap between two of the first front-side protruding portions 16 adjacent in the flow path width direction is smaller than the width W2 of the second back-side convex portions 25 along the flow path width direction. Such a size relationship enables reliable support of each of the second back-side convex portions 25 by the two first front-side protruding portions 16, and thus can further suppress falling of the second back-side convex portions 25 into the first front-side flow paths 11a. In addition, in the first embodiment, the size W3 of the gap between two of the second front-side protruding portions 26 adjacent in the flow path width direction is smaller than the width W4 of the first back-side convex portions 15 along the flow path width direction. Such a size relationship enables reliable support of each of the first back-side convex portion 15 by the two second front-side protruding portions 26, and thus can further suppress falling of the first back-side convex portions 15 into the second front-side flow paths 21a.

In the first embodiment, the first front-side protruding portions 16 are provided within a range from the middle between the apex portions 14a of the first front-side convex portions 14 and the apex portions 15a of the first back-side convex portions 15 to the apex portions 14a of the first front-side convex portions 14 in the stacking direction. Therefore, the first front-side protruding portions 16 can reliably support the second back-side convex portions 25, and thus falling of the second back-side convex portions 25 into the first front-side flow paths 11a can be further suppressed. In addition, in the first embodiment, the second front-side protruding portion 26 is provided within a range from the middle between the apex portions 24a of the second front-side convex portions 24 and the apex portions 25a of the second back-side convex portions 25 to the apex portions 24a of the second front-side convex portions 24 in the stacking direction. Therefore, the second front-side protruding portions 26 can reliably support the first back-side convex portions 15, and thus falling of the first back-side convex portions 15 into the second front-side flow paths 21a can be further suppressed.

In the first embodiment, the first front-side protruding portions 16 and the second front-side protruding portions 26 are hollow, so that it is possible to suppress an increase in weight due to the provision of the first front-side protruding portions 16 and the second front-side protruding portions 26.

In the first embodiment, the smaller the first front-side protruding portions 16 formed to have a symmetrical shape in the stacking direction, the larger the flow path cross-sectional area of the first front-side flow paths 11a can be secured, and the pressure loss in the first front-side flow paths 11a can be suppressed. In addition, the first front-side protruding portions 16 having a symmetrical shape in the stacking direction can have a cross-sectional area smaller than that of the first front-side protruding portions 16 having an asymmetrical shape in the stacking direction. Therefore, it is possible to secure a large flow path cross-sectional area of the first front-side flow paths 11a, and to suppress pressure loss in the first front-side flow paths 11a.

In the first embodiment, the smaller the second front-side protruding portions 26 formed to have a symmetrical shape in the stacking direction, the larger the flow path cross-sectional area of the second front-side flow paths 21a can be secured, and the pressure loss in the second front-side flow paths 21a can be suppressed. In addition, the second front-side protruding portions 26 having a symmetrical shape in the stacking direction can have a cross-sectional area smaller than that of the second front-side protruding portions 26 having an asymmetrical shape in the stacking direction. Therefore, it is possible: to secure a large flow path cross-sectional area of the second front-side flow paths 21a; and to suppress pressure loss in the second front-side flow paths 21a.

In the first embodiment, the heat exchange element 100 having a hexagonal columnar shape is exemplified, but it is not intended to limit the shape of the heat exchange element 100. That is, the heat exchange element 100 having a shape other than the hexagonal columnar shape may be used. Further, in the first embodiment, the example in which the first front-side protruding portions 16 are provided at both ends of each of the first front-side convex portions 14 in the flow path width direction is illustrated, but the first front-side protruding portion 16 may be provided at at least one of both ends of the first front-side convex portion 14 in the flow path width direction and the opposite end may be flat. When the first front-side protruding portions 16 are formed in this way, the first front-side protruding portions 16 can suppress falling of the second back-side convex portions 25, and pressure loss in the first front-side flow paths 11a can be also suppressed since the first front-side protruding portions 16 are not provided at the opposite ends of the first front-side convex portions 14 in the flow path width direction. Further, in the first embodiment, the example in which the second front-side protruding portions 26 are provided at both ends of each of the second front-side convex portion 24 in the flow path width direction is illustrated, but the second front-side protruding portion 26 may be provided at at least one end of both ends in the flow path width direction of the second front-side convex portion 24 and the opposite end may be flat. When the second front-side protruding portions 26 are formed in this way, the second front-side protruding portions 26 can suppress falling of the first back-side convex portions 15, and pressure loss in the second front-side flow paths 21a can be also suppressed since the second front-side protruding portions 26 are not provided at the opposite ends of the second front-side convex portions 24 in the flow path width direction.

Next, a heat exchange element 100A according to a first modification of the first embodiment will be described with reference to FIG. 6. FIG. 6 is a partially enlarged plan view illustrating first front-side protruding portions 16A or second front-side protruding portions 26A of the heat exchange element 100A according to the first modification of the first embodiment. Since the first front-side protruding portions 16A of a first heat transfer plate 1A and the second front-side protruding portions 26A of a second heat transfer plate 2A have the same structure, both of the reference signs of the first front-side protruding portions 16A and the second front-side protruding portions 26A are provided together in FIG. 6. In FIG. 6, the regions of the first front-side protruding portions 16A and the second front-side protruding portions 26A are clarified by dot hatching. The heat exchange element 100A according to the first modification is different from the heat exchange element 100 according to the first embodiment described above in arrangement of the first front-side protruding portions 16A and the second front-side protruding portions 26A. In the first modification, portions that are duplicate of portions of the heat exchange element 100 of the above-described first embodiment are denoted by the same reference signs, and description thereof is omitted.

The plurality of first front-side protruding portions 16A are provided at intervals along the flow path length direction. The first front-side protruding portions 16A provided at one end, in the flow path width direction, of each of first front-side convex portions 14A and the first front-side protruding portions 16A provided at the opposite end of the first front-side convex portions 14A are disposed alternately in the flow path length direction. The first front-side protruding portions 16A provided at one end, in the flow path width direction, of each of the first front-side convex portions 14A and the first front-side protruding portions 16A provided at the opposite end of the first front-side convex portions 14A are misaligned from each other in the flow path length direction.

The plurality of second front-side protruding portions 26A are provided at intervals along the flow path length direction. The second front-side protruding portions 26A provided at one end, in the flow path width direction, of each of second front-side convex portions 24A and the second front-side protruding portions 26A provided at the opposite end of the second front-side convex portions 24A are disposed alternately in the flow path length direction. The second front-side protruding portions 26A provided at one end, in the flow path width direction, of each of the second front-side convex portions 24A and the second front-side protruding portions 26A provided at the opposite end of the second front-side convex portions 24A are misaligned from each other in the flow path length direction.

In the first modification, the first front-side protruding portions 16A provided at one end, in the flow path width direction, of each of the first front-side convex portions 14A and the first front-side protruding portions 16A provided at the opposite end of the first front-side convex portions 14A are alternately arranged in the flow path length direction, so that the positions of the first front-side protruding portions 16A can be dispersed in the flow path length direction. Therefore, in a case where the first corrugated portion 11 and the first front-side protruding portions 16A are integrally formed using a resin sheet as a base material, shape distortion of the entire first heat transfer plate 1A can be suppressed, and falling of the second back-side convex portions 25 (not illustrated) can be further suppressed by the first front-side protruding portions 16A. In addition, in the first modification, the second front-side protruding portions 26A provided at one end, in the flow path width direction, of each of the second front-side convex portions 24A and the second front-side protruding portions 26A provided at the opposite end of the second front-side convex portions 24A are alternately arranged in the flow path length direction, so that the positions of the second front-side protruding portions 26A can be dispersed in the flow path length direction. Therefore, in a case where the second corrugated portion 21 and the second front-side protruding portions 26A are integrally formed using a resin sheet as a base material, shape distortion of the entire second heat transfer plate 2A can be suppressed, and falling of the first back-side convex portions 15 (not illustrated) can be further suppressed by the second front-side protruding portions 26A.

Next, a heat exchange element 100B according to a second modification of the first embodiment will be described with reference to FIG. 7. FIG. 7 is a partially enlarged plan view illustrating first front-side protruding portions 16B or second front-side protruding portions 26B of the heat exchange element 100B according to the second modification of the first embodiment. Since the first front-side protruding portions 16B of a first heat transfer plate 1B and the second front-side protruding portions 26B of a second heat transfer plate 2B have the same structure, both of the reference signs of the first front-side protruding portions 16B and the second front-side protruding portions 26B are provided together in FIG. 7. In FIG. 7, the regions of the first front-side protruding portions 16B and the second front-side protruding portions 26B are clarified by dot hatching. The heat exchange element 100B according to the second modification is different from the heat exchange element 100 according to the first embodiment described above in shapes of the first front-side protruding portions 16B and the second front-side protruding portions 26B. In the second modification, portions that are duplicate of portions of the heat exchange element 100 of the above-described first embodiment are denoted by the same reference signs, and description thereof is omitted.

One of the first front-side protruding portions 16B is provided at each of one end and the opposite end of each of first front-side convex portions 14B in the flow path width direction. The first front-side protruding portions 16B extend over the entire length of the first front-side convex portions 14B in the flow path length direction. One of the second front-side protruding portions 26B is provided at each of one end and the opposite end of each of second front-side convex portions 24B in the flow path width direction. The second front-side protruding portions 26B extend over the entire length of the second front-side convex portions 24B in the flow path length direction.

In the second modification, the first front-side protruding portions 16B extend over the entire length of the first front-side convex portions 14B in the flow path length direction, so that it is possible to suppress partial falling of the second back-side convex portions 25 (not illustrated) into the first front-side flow paths 11a. In addition, in the second modification, the second front-side protruding portions 26B extend over the entire length of the second front-side convex portions 24B in the flow path length direction, so that it is possible to suppress partial falling of the first back-side convex portions 15 (not illustrated) into the second front-side flow paths 21a.

Next, a heat exchange element 100C according to a third modification of the first embodiment will be described with reference to FIG. 8. FIG. 8 is a cross-sectional view illustrating first front-side protruding portions 16C or second front-side protruding portions 26C of the heat exchange element 100C according to the third modification of the first embodiment. Since the first front-side protruding portions 16C of a first heat transfer plate 1C and the second front-side protruding portions 26C of a second heat transfer plate 2C have the same structure, both of reference signs of the first front-side protruding portions 16C and the second front-side protruding portions 26C are provided together in FIG. 8. The heat exchange element 100C according to the third modification is different from the heat exchange element 100 according to the first embodiment described above in shapes of the first front-side protruding portions 16C and the second front-side protruding portions 26C. In the third modification, portions that are duplicate of portions of the heat exchange element 100 of the above-described first embodiment are denoted by the same reference signs, and description thereof is omitted.

The first front-side protruding portions 16C each include: a first inclined portion 18a having a protruding amount that increases from one side toward the opposite side in the stacking direction; and a second inclined portion 18b having a protruding amount that decreases from an apex portion 18c toward the opposite side in the stacking direction. The apex portion 18c is the most protruding portion of the first inclined portion 18a. The first front-side protruding portion 16C is formed to have an asymmetric shape in which a length of the second inclined portion 18b along the stacking direction is larger than a length of the first inclined portion 18a along the stacking direction. The first front-side protruding portions 16C are hollow. The plate thickness of first front-side convex portions 14C including the first front-side protruding portions 16C is uniform.

The second front-side protruding portions 26C each include a first inclined portion 28a having a protruding amount that increases from one side toward the opposite side in the stacking direction and a second inclined portion 28b having a protruding amount that decreases from an apex portion 28c toward the opposite side in the stacking direction. The apex portion 28c is the most protruding portion of the first inclined portion 28a. The second front-side protruding portion 26C is formed to have an asymmetric shape in which a length of the second inclined portion 28b along the stacking direction is larger than a length of the first inclined portion 28a along the stacking direction. The second front-side protruding portions 26C are hollow. The plate thickness of second front-side convex portions 24C including the second front-side protruding portions 26C is uniform.

In the third modification, the first front-side protruding portions 16C each include: the first inclined portion 18a having a protruding amount that increases from one side toward the opposite side in the stacking direction; and the second inclined portion 18b having a protruding amount that decreases from the most protruding portion of the first inclined portion 18a toward the opposite side in the stacking direction. The first front-side protruding portion 16C is formed to have an asymmetric shape in which a length of the second inclined portion 18b along the stacking direction is larger than a length of the first inclined portion 18a along the stacking direction. As a result, the position of the apex portions 18c of the first front-side protruding portions 16C can be brought close to the apex portions 14a of the first front-side convex portions 14C in the stacking direction, so that it is possible to suppress falling of the second back-side convex portions 25 (not illustrated) supported by the first front-side protruding portions 16C. In addition, since the position of the apex portions 18c of the first front-side protruding portions 16C can be brought close to the apex portions 14a of the first front-side convex portions 14C in the stacking direction, the buckling strength of the first front-side convex portions 14C against the stacking load applied from one side to the opposite side in the stacking direction can be improved to enhance the rigidity of the first front-side convex portions 14C.

Further, in the third modification, the second front-side protruding portions 26C each include: the first inclined portion 28a having a protruding amount that increases from one side toward the opposite side in the stacking direction; and the second inclined portion 28b having a protruding amount that decreases from the most protruding portion of the first inclined portion 28a toward the opposite side in the stacking direction. The second front-side protruding portion 26C is formed to have an asymmetric shape in which a length of the second inclined portion 28b along the stacking direction is larger than a length of the first inclined portion 28a along the stacking direction. As a result, the position of the apex portions 28c of the second front-side protruding portions 26C can be brought close to the apex portions 24a of the second front-side convex portions 24C in the stacking direction, so that it is possible to suppress falling of the first back-side convex portions 15 (not illustrated) supported by the second front-side protruding portions 26C. In addition, since the position of the apex portions 28c of the second front-side protruding portions 26C can be brought close to the apex portions 24a of the second front-side convex portions 24C in the stacking direction, the buckling strength of the second front-side convex portions 24C against the stacking load applied from one side to the opposite side in the stacking direction can be improved to enhance the rigidity of the second front-side convex portions 24C. In the third modification, the first front-side protruding portions 16C and the second front-side protruding portions 26C are hollow, so that it is possible to suppress an increase in weight due to the provision of the first front-side protruding portions 16C and the second front-side protruding portions 26C.

Next, a heat exchange element 100D according to a fourth modification of the first embodiment will be described with reference to FIG. 9. FIG. 9 is a cross-sectional view illustrating first front-side protruding portions 16D and second front-side protruding portions 26D of the heat exchange element 100D according to the fourth modification of the first embodiment. Since the first front-side protruding portions 16D of a first heat transfer plate 1D and the second front-side protruding portions 26D of a second heat transfer plate 2D have the same structure, both of reference signs of the first front-side protruding portions 16D and the second front-side protruding portions 26D are provided together in FIG. 9. The heat exchange element 100D according to the fourth modification is different from the heat exchange element 100 according to first embodiment described above in shapes of the first front-side protruding portions 16D and the second front-side protruding portions 26D. In the fourth modification, portions that are duplicate of portions of the heat exchange element 100 of the above-described first embodiment are denoted by the same reference signs, and description thereof is omitted.

The first front-side protruding portions 16D are formed to have a symmetrical shape in the stacking direction. In the fourth modification, the shape of the first front-side protruding portions 16D is a solid semicircular shape that is convex toward the other first front-side convex portions 14D adjacent in the flow path width direction. The portions of the first front-side convex portions 14D where the first front-side protruding portions 16D are formed have a plate thickness larger than the other portions. The plate thickness of the first front-side convex portions 14D is changed partially.

The second front-side protruding portions 26D are formed to have a symmetrical shape in the stacking direction. In the fourth modification, the shape of the second front-side protruding portions 26D is a solid semicircular shape that is convex toward the other second front-side convex portions 24D adjacent in the flow path width direction. The portions of the second front-side convex portions 24D where the second front-side protruding portions 26D are formed have a plate thickness larger than the other portions. The plate thickness of the second front-side convex portions 24D is changed partially.

In the fourth modification, the first front-side protruding portions 16D are solid, so that the rigidity of the first front-side protruding portions 16D can be enhanced. In addition, in the fourth modification, the second front-side protruding portions 26D are solid, so that the rigidity of the second front-side protruding portions 26D can be enhanced.

Figure 10:
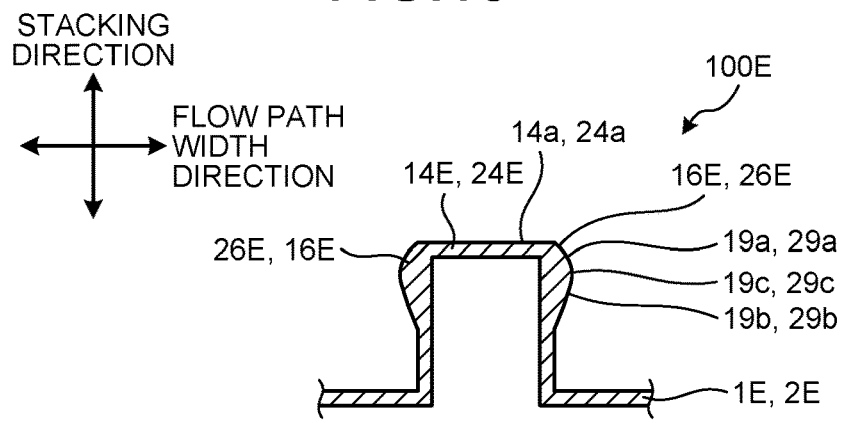
FIG. 10 is a cross-sectional view illustrating first front-side protruding portions and second front-side protruding portions of a heat exchange element according to a fifth modification of the first embodiment.

Next, a heat exchange element 100E according to a fifth modification of the first embodiment will be described with reference to FIG. 10. FIG. 10 is a cross-sectional view illustrating first front-side protruding portions 16E and second front-side protruding portions 26E of the heat exchange element 100E according to the fifth modification of the first embodiment. Since the first front-side protruding portions 16E of the first heat transfer plate 1E and the second front-side protruding portions 26E of the second heat transfer plate 2E have the same structure, both of reference signs of the first front-side protruding portions 16E and the second front-side protruding portions 26E are provided together in FIG. 10. The heat exchange element 100E according to the fifth modification is different from the heat exchange element 100 according to first embodiment described above in shapes of the first front-side protruding portions 16E and the second front-side protruding portions 26E. In the fifth modification, portions that are duplicate of portions of the heat exchange element 100 of the above-described first embodiment are denoted by the same reference signs, and description thereof is omitted.

The first front-side protruding portions 16E each include: a first inclined portion 19a having a protruding amount that increases from one side toward the opposite side in the stacking direction; and a second inclined portion 19b having a protruding amount that decreases from an apex portion 19c toward the opposite side in the stacking direction. The apex portion 19c is the most protruding portion of the first inclined portion 19a. The first front-side protruding portion 16E is formed to have an asymmetric shape in which a length of the second inclined portion 19b along the stacking direction is larger than a length of the first inclined portion 19a along the stacking direction. The first front-side protruding portions 16E are solid. In the first front-side convex portions 14E, the first front-side protruding portions 16E have a plate thickness larger than the thickness of the other portions. The plate thickness of the first front-side convex portions 14E is changed partially.

The second front-side protruding portions 26E each include a first inclined portion 29a having a protruding amount that increases from one side toward the opposite side in the stacking direction and a second inclined portion 29b having a protruding amount that decreases from an apex portion 29c toward the opposite side in the stacking direction. The apex portion 29c is the most protruding portion of the first inclined portion 29a. The second front-side protruding portion 26E is formed to have an asymmetric shape in which a length of the second inclined portion 29b along the stacking direction is larger than a length of the first inclined portion 29a along the stacking direction. The second front-side protruding portions 26E are solid. In the front-side convex portions 24E, the second front-side protruding portions 26E have a plate thickness larger than the other portions. The plate thickness of the second front-side convex portions 24E is changed partially.

In the fifth modification, the first front-side protruding portions 16E each include: a first inclined portion 19a having a protruding amount that increases from one side toward the opposite side in the stacking direction; and a second inclined portion 19b having a protruding amount that decreases from an apex portion 19c toward the opposite side in the stacking direction. The apex portion 19c is the most protruding portion of the first inclined portion 19a. The first front-side protruding portion 16E is formed to have an asymmetric shape in which a length of the second inclined portion 19b along the stacking direction is larger than a length of the first inclined portion 19a along the stacking direction. As a result, the position of the apex portions 19c of the first front-side protruding portion 16E can be brought close to the apex portions 14a of the first front-side convex portion 14E in the stacking direction, so that it is possible to suppress falling of the second back-side convex portions 25 (not illustrated) supported by the first front-side protruding portions 16E. In addition, since the position of the apex portions 19c of the first front-side protruding portions 16E can be brought close to the apex portions 14a of the first front-side convex portions 14E in the stacking direction, the buckling strength of the first front-side convex portions 14E against the stacking load applied from one side to the opposite side in the stacking direction can be improved to enhance the rigidity of the first front-side convex portions 14E. Furthermore, in the fifth modification, the first front-side protruding portions 16E are solid, so that the rigidity of the first front-side protruding portions 16E can be further enhanced.

Further, in the fifth modification, the second front-side protruding portions 26E each include: the first inclined portion 29a having a protruding amount that increases from one side toward the opposite side in the stacking direction; and the second inclined portion 29b having a protruding amount that decreases from an apex portion 29c toward the opposite side in the stacking direction. The apex portion 29c is the most protruding portion of the first inclined portion 29a. The second front-side protruding portions 26E are formed to have an asymmetric shape in which a length of the second inclined portion 29b along the stacking direction is larger than a length of the first inclined portion 29a along the stacking direction. As a result, the position of the apex portions 29c of the second front-side protruding portions 26E can be brought close to the apex portions 24a of the second front-side convex portions 24E in the stacking direction, so that it is possible to suppress falling of the first back-side convex portions 15 (not illustrated) supported by the second front-side protruding portions 26E. In addition, since the position of the apex portions 29c of the second front-side protruding portions 26E can be brought close to the apex portions 24a of the second front-side convex portions 24E in the stacking direction, the buckling strength of the second front-side convex portions 24E against the stacking load applied from one side to the opposite side in the stacking direction can be improved to enhance the rigidity of the second front-side convex portions 24E. In addition, in the fifth modification, the second front-side protruding portions 26E are solid, so that the rigidity of the second front-side protruding portions 26E can be further enhanced.

Second Embodiment

Figure 11:
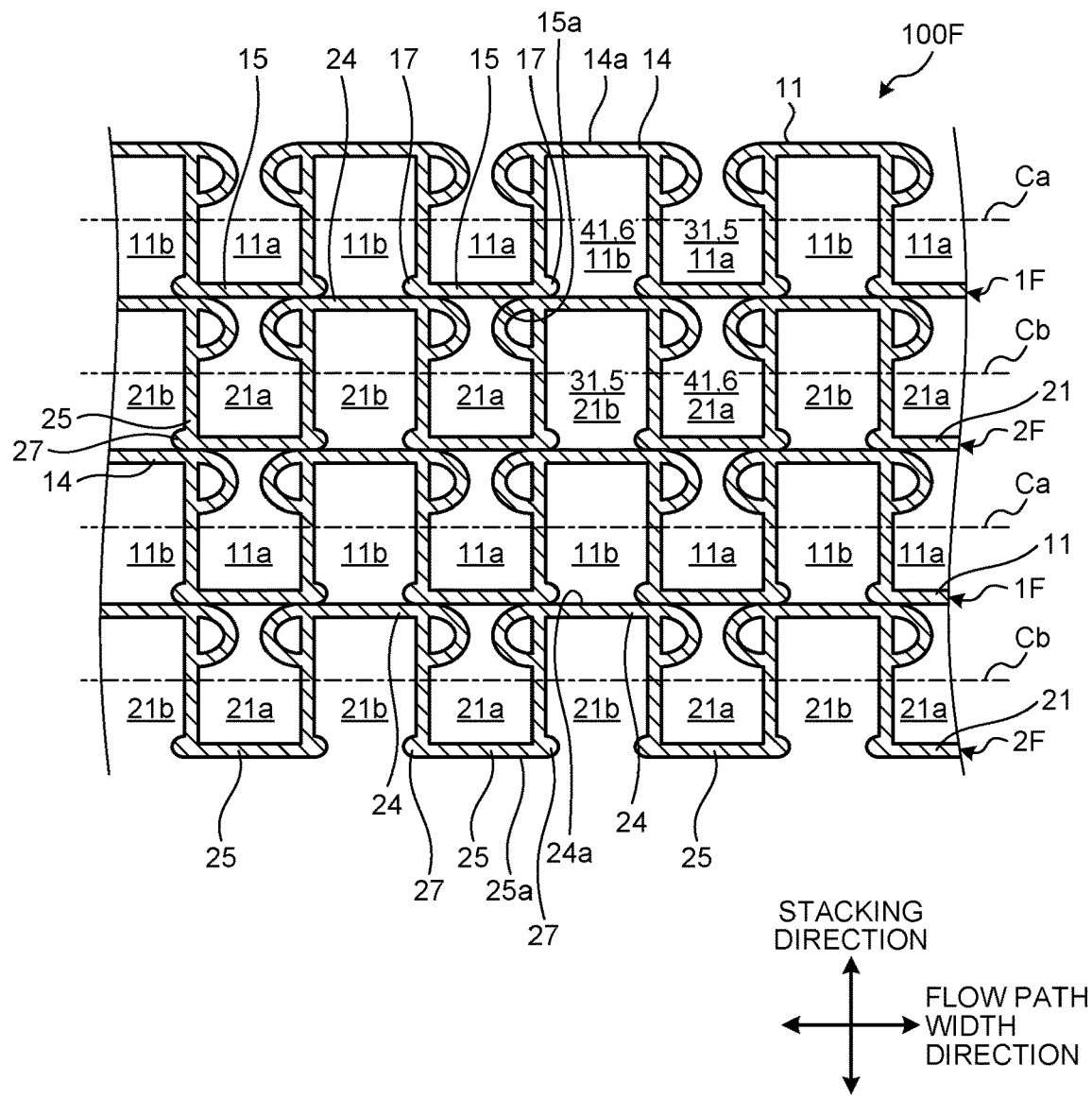
FIG. 11 is a cross-sectional view illustrating a heat exchange element according to a second embodiment and is a view corresponding to the cross-sectional view taken along line IV-IV in FIGS. 2 and 3.

Next, a heat exchange element 100F according to a second embodiment will be described with reference to FIG. 11. FIG. 11 is a cross-sectional view illustrating the heat exchange element 100F according to the second embodiment and is a view corresponding to the cross-sectional view taken along line IV-IV in FIGS. 2 and 3. The second embodiment is different from the first embodiment described above in that: first heat transfer plates 1F include first back-side protruding portions 17; and second heat transfer plates 2F include second back-side protruding portions 27. In the second embodiment, portions that are duplicate of portions of the above-described first embodiment are denoted by the same reference signs, and description thereof is omitted.

At both ends of each of the first back-side convex portions 15 in the flow path width direction, there are provided the first back-side protruding portions 17 that protrude toward the other first back-side convex portions 15 adjacent in the flow path width direction. The first back-side protruding portions 17 are contactable with the second heat transfer plates 2F adjacent to the first heat transfer plate 1F in the −X direction in the stacking direction. The first back-side protruding portions 17 are supported by corresponding one of the second front-side convex portions 24 of the second heat transfer plate 2F. The first back-side protruding portions 17 are preferably provided in a range from the middle between the apex portions 15a of the first back-side convex portions 15 and the apex portions 14a of the first front-side convex portions 14 to the apex portions 15a of the first back-side convex portion 15 in the stacking direction, and more preferably at a position close to the apex portions 15a of the first back-side convex portion 15 in the stacking direction. The first back-side protruding portions 17 do not protrude from the apex portions 15a of the first back-side convex portions 15 in the −X direction in the stacking direction. The shape of the first back-side protruding portions 17 is not particularly limited, but is, in the second embodiment, a solid semicircular shape that is convex toward other ones, adjacent in the flow path width direction, of the first back-side convex portions 15.

At both ends of each of the second back-side convex portions 25 in the flow path width direction, there are provided the second back-side protruding portions 27 that protrude toward the other second back-side convex portions 25 adjacent in the flow path width direction. The second back-side protruding portions 27 are contactable with the first heat transfer plates 1F adjacent to the second heat transfer plate 2F in the −X direction in the stacking direction. The second back-side protruding portions 27 are supported by corresponding one of the first front-side convex portions 14 of the first heat transfer plate 1F. The second back-side protruding portions 27 are preferably provided in a range from the middle between the apex portions 25a of the second back-side convex portion 25 and the apex portions 24a of the second front-side convex portions 24 to the apex portions 25a of the second back-side convex portions 25 in the stacking direction, and more preferably at a position close to the apex portions 25a of the second back-side convex portions 25 in the stacking direction. The second back-side protruding portions 27 do not protrude from the apex portions 25a of the second back-side convex portions 25 in the −X direction in the stacking direction. The shape of the second back-side protruding portions 27 is not particularly limited, but is, in the second embodiment, a solid semicircular shape that is convex toward other ones, adjacent in the flow path width direction, of the second back-side convex portions 25.

Although not illustrated, a die for manufacturing the first heat transfer plates 1F and the second heat transfer plates 2F has recesses for forming the first back-side protruding portions 17 and the second back-side protruding portions 27. Compressed air is blown into the die to cause the resin sheet to lay along the recesses of the die. Although the portions of the resin sheet laying along the recesses of the die, that is, the first back-side protruding portions 17 and the second back-side protruding portions 27 are undercuts, formed articles can be removed from the die by forced removal because thin resin sheets are used as the base materials of the first heat transfer plate 1F and the second heat transfer plate 2F in the second embodiment.

In the second embodiment, at both ends of each of the first back-side convex portions 15 in the flow path width direction, there are provided the first back-side protruding portions 17 that protrude toward the other first back-side convex portions 15 adjacent in the flow path width direction. The first back-side protruding portions 17 are contactable with the second heat transfer plates 2F adjacent to the first heat transfer plate 1F in the −X direction in the stacking direction. Therefore, when the plurality of first heat transfer plates 1F and the plurality of second heat transfer plates 2F are stacked, the second front-side convex portions 24 of the second heat transfer plates 2F can reliably support the first back-side convex portions 15 of the first heat transfer plates 1F. As a result, deformation of the first corrugated portions 11 can be suppressed, and falling of the first back-side convex portions 15 into the second front-side flow paths 21a can be suppressed, so that it is possible to suppress blockage or excessive open of the first partial flow paths 31 and the fourth partial flow paths 41. Therefore, it is possible to suppress variations in pressure loss among the plurality of first partial flow paths 31, and to suppress variations in pressure loss among the plurality of fourth partial flow paths 41, so that it is possible to improve heat exchange efficiency of the heat exchange element 100F.

In the second embodiment, at both ends of each of the second back-side convex portions 25 in the flow path width direction, there are provided the second back-side protruding portions 27 that protrude toward the other second back-side convex portions 25 adjacent in the flow path width direction. The second back-side protruding portions 27 are contactable with the first heat transfer plates 1F adjacent to the second heat transfer plate 2F in the −X direction in the stacking direction. Therefore, when the plurality of first heat transfer plates 1F and the plurality of second heat transfer plates 2F are stacked, the first front-side convex portions 14 of the first heat transfer plates 1F can reliably support the second back-side convex portions 25 of the second heat transfer plates 2F. As a result, deformation of the second corrugated portions 21 can be suppressed, and falling of the second back-side convex portions 25 into the first front-side flow paths 11a can be suppressed, so that it is possible to suppress blockage or excessive open of the first partial flow paths 31 and the fourth partial flow paths 41. Therefore, it is possible to suppress variations in pressure loss among the plurality of first partial flow paths 31, and to suppress variations in pressure loss among the plurality of fourth partial flow paths 41, so that it is possible to improve heat exchange efficiency of the heat exchange element 100F.

In the second embodiment, the example in which the first back-side protruding portions 17 are provided at both ends of each of the first back-side convex portions 15 in the flow path width direction is illustrated, but the first back-side protruding portion 17 may be provided at at least one of both ends of the first back-side convex portion 15 in the flow path width direction and the opposite end may be flat. When the first back-side protruding portions 17 are formed in this way, the first back-side protruding portions 17 can suppress falling of the first back-side convex portions 15, and pressure loss in the first back-side flow paths 11b can be also suppressed since the first back-side protruding portions 17 are not provided at the opposite ends of the first back-side convex portions 15 in the flow path width direction. Further, in the second embodiment, the example in which the second back-side protruding portions 27 are provided at both ends of each of the second back-side convex portions 25 in the flow path width direction is illustrated, but the second back-side protruding portion 27 may be provided at at least one end of both ends of the second back-side convex portion 25 in the flow path width direction and the opposite end may be flat. When the second back-side protruding portions 27 are formed in this way, the second back-side protruding portion 27 can suppress falling of the second back-side convex portions 25, and pressure loss in the second back-side flow paths 21b can be suppressed since the second back-side protruding portions 27 are not provided at the opposite ends of the second back-side convex portions 25 in the flow path width direction.

The configurations described in the above-described embodiments provide examples, and any of the configurations can be combined with another known technique, the embodiments can be combined with each other, or a part of the configurations can be eliminated or changed without departing from the gist of the present invention.

REFERENCE SIGNS LIST 1, 1A, 1B, 1C, 1D, 1E, 1F first heat transfer plate; 2, 2A, 2B, 2C, 2D, 2E, 2F second heat transfer plate; 3 first flow path; 4 second flow path; 5 first air flow; 6 second air flow; 11 first corrugated portion; 11a first front-side flow path; 11b first back-side flow path; 12 first header portion; 12a first flow path rib; 13 second header portion; 13a second flow path rib; 14, 14A, 14B, 14C, 14D, 14E first front-side convex portion; 14a, 15a, 18c, 19c, 24a, 25a, 28c, 29c apex portion 15 first back-side convex portion; 16, 16A, 16B, 16C, 16D, 16E first front-side protruding portion; 17 first back-side protruding portion; 18a, 19a, 28a, 29a first inclined portion; 18b, 19b, 28b, 29b second inclined portion; 21 second corrugated portion; 21a second front-side flow path; 21b second back-side flow path; 22 third header portion; 22a third flow path rib; 23 fourth header portion; 23a fourth flow path rib; 24, 24A, 24B, 24C, 24D, 24E second front-side convex portion; 25 second back-side convex portion; 26, 26A, 26B, 26C, 26D, 26E second front-side protruding portion; 27 second back-side protruding portion; 31 first partial flow path; 32 second partial flow path; 33 third partial flow path; 41 fourth partial flow path; 42 fifth partial flow path; 43 sixth partial flow path; 100, 100A, 100B, 100C, 100D, 100E, 100F heat exchange element.

The invention claimed is:

1. A heat transfer plate that includes a plurality of flow paths formed on both front and back surfaces in a first direction and adapted to form a heat exchange element by stacking a plurality of the heat transfer plates in the first direction, the heat transfer plate comprising
a corrugated portion having a corrugated shape adapted to form each of parts of the plurality of flow paths, wherein
the corrugated portion includes:
front-side convex portions that are convex toward one side in the first direction; and
back-side convex portions that are convex toward an opposite side in the first direction, the front-side convex portions and the back-side convex portions are formed alternately along a second direction orthogonal to the first direction, and
at at least one end of both ends of each of the front-side convex portions in the second direction, there is provided a front-side protruding portion that protrudes toward other front-side convex portions adjacent in the second direction, and that has plate thickness thicker than plate thickness of other portions of the corrugated portion, wherein the front-side protruding portion is contactable with adjacent heat transfer plates in the first direction.

2. The heat transfer plate according to claim 1, wherein at at least one end of both ends of each of the back-side convex portions in the second direction, there is provided a back-side protruding portion that protrudes toward other back-side convex portions adjacent in the second direction, wherein the back-side protruding portion is contactable with adjacent heat transfer plate in the first direction.

3. The heat transfer plate according to claim 1, wherein at each of the both ends of each of the front-side convex portions in the second direction, the front-side protruding portion is provided,
two of the front-side protruding portions adjacent to each other in the second direction are arranged with a gap therebetween in the second direction, and
a size of the gap between the two front-side protruding portions adjacent in the second direction is smaller than a width of the back-side convex portions along the second direction.

4. The heat transfer plate according to claim 1, wherein the front-side protruding portion is provided within a range from a middle between an apex portion of each of the front-side convex portions and an apex portion of each of the back-side convex portions to the apex portion of the front-side convex portion in the first direction.

5. The heat transfer plate according to claim 1, wherein the front-side protruding portion includes:
a first inclined portion having a protruding amount that increases from the one side toward the opposite side in the first direction; and
a second inclined portion having a protruding amount decreasing from a most protruding portion of the first inclined portion toward the opposite side in the first direction, and
the front protruding portion is formed to have an asymmetric shape in which a length of the second inclined portion along the first direction is larger than a length of the first inclined portion along the first direction.

6. A heat exchange element comprising
first heat transfer plates and second heat transfer plates stacked alternately to form:
a plurality of first flow paths between a front surface of each of the first heat transfer plates and a back surface of an adjacent one of the second heat transfer plates; and
a plurality of second flow paths between the back surface of each of the first heat transfer plates and the front surface of an adjacent one of the second heat transfer plates, wherein
the first heat transfer plates each include a first corrugated portion having a corrugated shape that forms parts of each of the plurality of first flow paths and forming parts of each of the plurality of second flow paths,
the second heat transfer plates each include a second corrugated portion having a corrugated shape that forms parts of each of the plurality of second flow paths and forming parts of each of the plurality of first flow paths,
the first corrugated portion and the second corrugated portion are disposed at positions coinciding in a first direction that is a stacking direction of the first heat transfer plates and the second heat transfer plates,
in the first corrugated portion, first front-side convex portions that are convex toward one side in the first direction and first back-side convex portions that are convex toward an opposite side in the first direction are alternately formed along a second direction orthogonal to the first direction,
in the second corrugated portion, second front-side convex portions that are convex toward the one side in the first direction and second back-side convex portions that are convex toward the opposite side in the first direction are alternately formed along the second direction orthogonal to the first direction,
the first front-side convex portions and the second front-side convex portions are disposed at positions coinciding in the first direction,
the first back-side convex portions and the second back-side convex portions are disposed at positions coinciding in the first direction,
at at least one end of both ends of each of the first front-side convex portions in the second direction, there is provided a first front-side protruding portion:
that has plate thickness thicker than plate thickness of other portions of the first corrugated portion;
that protrudes toward another one of the first front-side convex portions adjacent in the second direction; and
that is contactable with corresponding one of the second back-side convex portions of one of the second heat transfer plates adjacent to the first heat transfer plate in the first direction, and
at at least one end of both ends of each of the second front-side convex portions in the second direction, there is provided a second front-side protruding portion:
that has plate thickness thicker than plate thickness of other portions of the second corrugated portion;
that protrudes toward another one of the second front-side convex portions adjacent in the second direction; and
that is contactable with corresponding one of the first back-side convex portions of one of the first heat transfer plates adjacent to the second heat transfer plate in the first direction.

* * * * *